United States Patent
Ruffalo

[11] Patent Number: 5,887,850
[45] Date of Patent: Mar. 30, 1999

[54] SPRING LOADED VALVE HANDLE

[75] Inventor: Carl Joseph Ruffalo, Herkimer, N.Y.

[73] Assignee: New York Air Brake Corporation, Watertown, N.Y.

[21] Appl. No.: 13,265

[22] Filed: Jan. 26, 1998

[51] Int. Cl.[6] ............................ F16K 35/02; F16K 31/60
[52] U.S. Cl. ............................ 251/95; 251/99; 251/104; 251/105; 251/288; 16/110 R; 16/114 R
[58] Field of Search .............................. 251/95, 99, 101, 251/103, 104, 105, 107, 108, 286, 288; 70/175, 176, 177, 180, 212; 16/110 R, 114 R, DIG. 36

[56] References Cited

U.S. PATENT DOCUMENTS

| | | | |
|---|---|---|---|
| 451,895 | 5/1891 | Hescock et al. | 251/108 |
| 538,317 | 4/1895 | Boynton | 251/243 |
| 952,121 | 3/1910 | Koehler | 251/99 |
| 952,743 | 3/1910 | Jenkins | 251/99 |
| 979,344 | 12/1910 | Shallow | 251/227 |
| 1,035,490 | 8/1912 | Stott et al. | 251/99 |
| 1,380,307 | 5/1921 | Capewell | 251/107 |
| 1,509,816 | 9/1924 | Kendrick | 251/99 |
| 1,583,142 | 5/1926 | Hanrahan | 251/98 |
| 1,787,775 | 1/1931 | Campbell | 251/105 |
| 2,065,750 | 12/1936 | Safford | 251/99 |
| 2,147,287 | 2/1939 | Farmer | 251/109 |
| 2,553,349 | 5/1951 | Annicq | 251/107 |
| 2,565,244 | 8/1951 | Laurent | 251/107 |
| 2,678,186 | 5/1954 | Blackford | 251/105 |
| 2,855,154 | 10/1958 | Tyler et al. | 74/522 |
| 3,019,811 | 2/1962 | Young et al. | 137/543.13 |
| 3,184,212 | 5/1965 | Billeter | 251/105 |
| 3,301,271 | 1/1967 | Burke | 251/105 |
| 3,858,843 | 1/1975 | Hartmann | 251/99 |
| 4,099,543 | 7/1978 | Mong et al. | 137/625.22 |
| 4,125,128 | 11/1978 | Elward et al. | 137/596 |
| 4,126,023 | 11/1978 | Smith et al. | 251/104 |
| 4,456,219 | 6/1984 | Scott et al. | 251/99 |
| 4,548,237 | 10/1985 | Bogenschutz | 137/625.22 |
| 4,770,388 | 9/1988 | Carman | 251/104 |
| 4,909,275 | 3/1990 | Massey et al. | 137/385 |
| 5,072,913 | 12/1991 | Carroll et al. | 251/99 |
| 5,183,073 | 2/1993 | Roberts | 251/105 |
| 5,188,335 | 2/1993 | Pettinaroli | 251/104 |

*Primary Examiner*—George L. Walton
*Assistant Examiner*—Bryan Wallace
*Attorney, Agent, or Firm*—Barnes & Thornburg

[57] ABSTRACT

A unitary handle structure to be secured to the shaft of the valve and cooperate with the stops on the body to delimit and lock the valve element in its open and closed positions. The handle structure includes a socket portion fixed to the stem of the valve element and a handle portion extending from the socket portion and doubling back towards the socket portion and terminating at an end adjacent the socket portion. A detent portion on the end includes a pair of walls sufficiently spaced to receive the stops to lock the valve element in the open and closed positions. The handle portion is flexibly resilient to allow the detent portion to raise and lower with respect to the stops. One of the walls of the detent has a height high enough and the end of the handle portion is separated from the adjacent portion of the handle by a sufficiently short distance to prevent the one wall of the detent portion from raising above the stops.

13 Claims, 4 Drawing Sheets

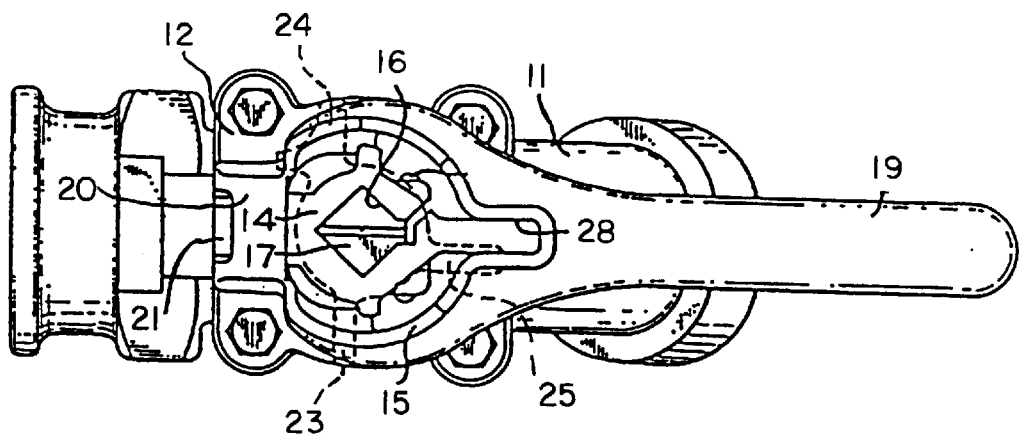
PRIOR ART
FIG. 1
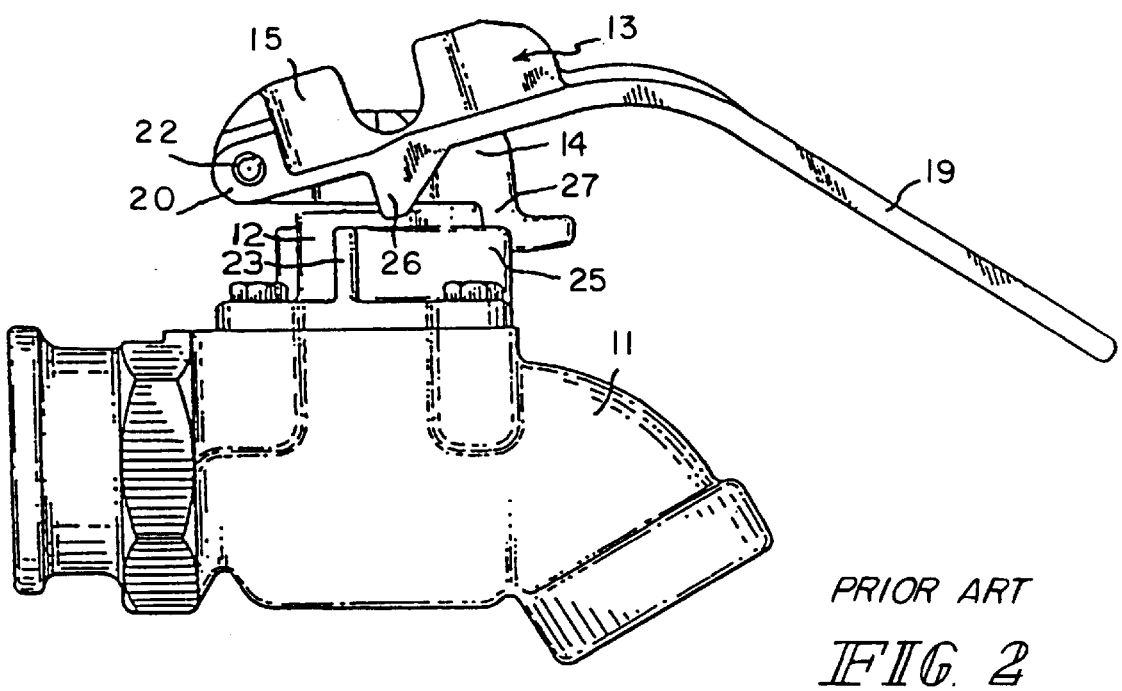
PRIOR ART
FIG. 2

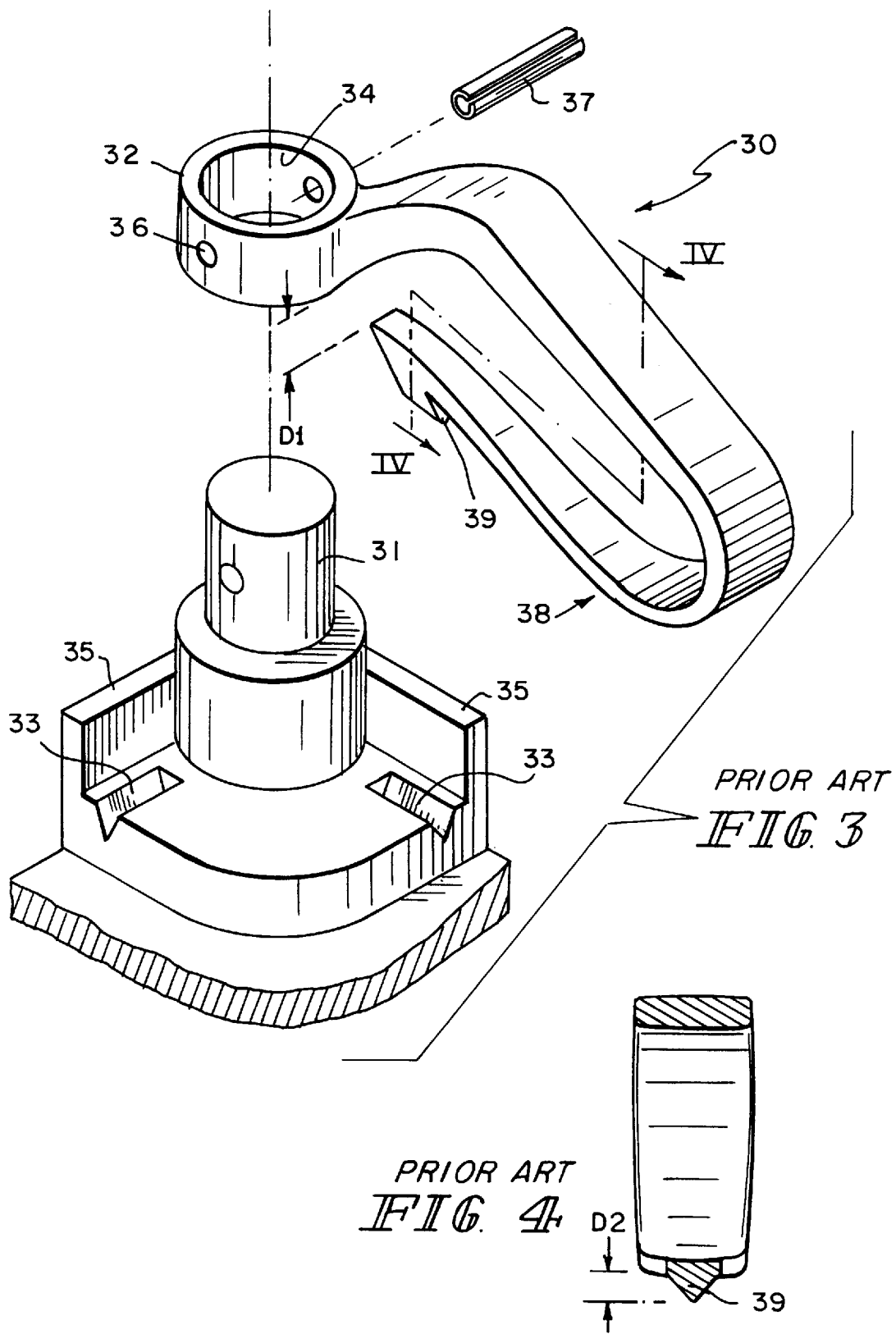
PRIOR ART
FIG. 3
PRIOR ART
FIG. 4

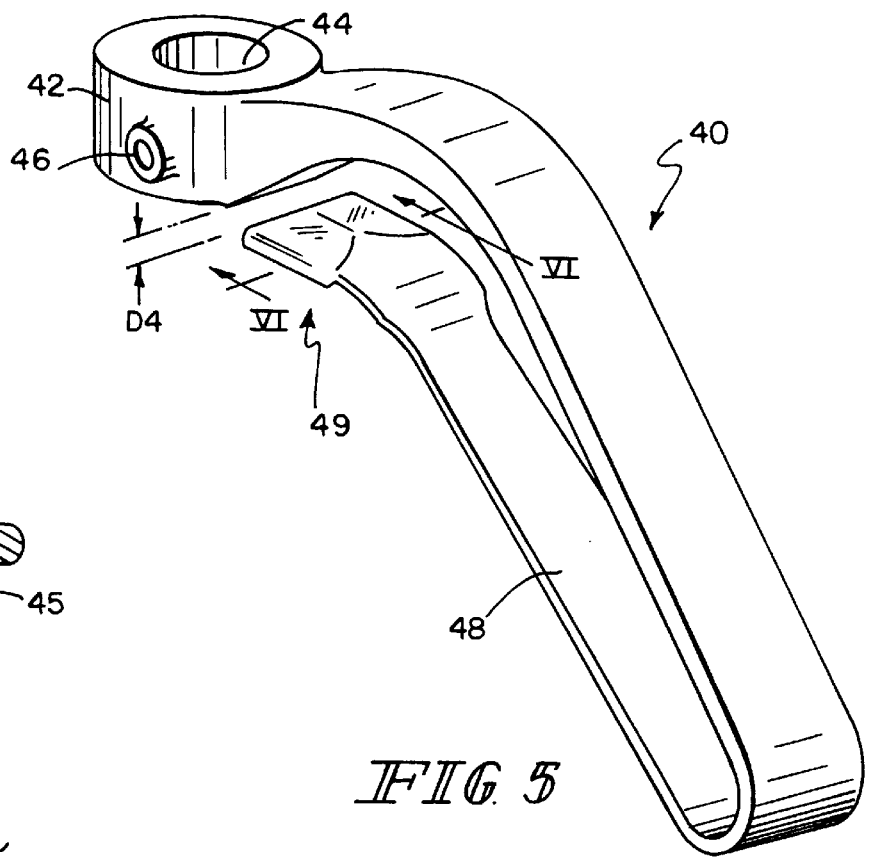
FIG. 5
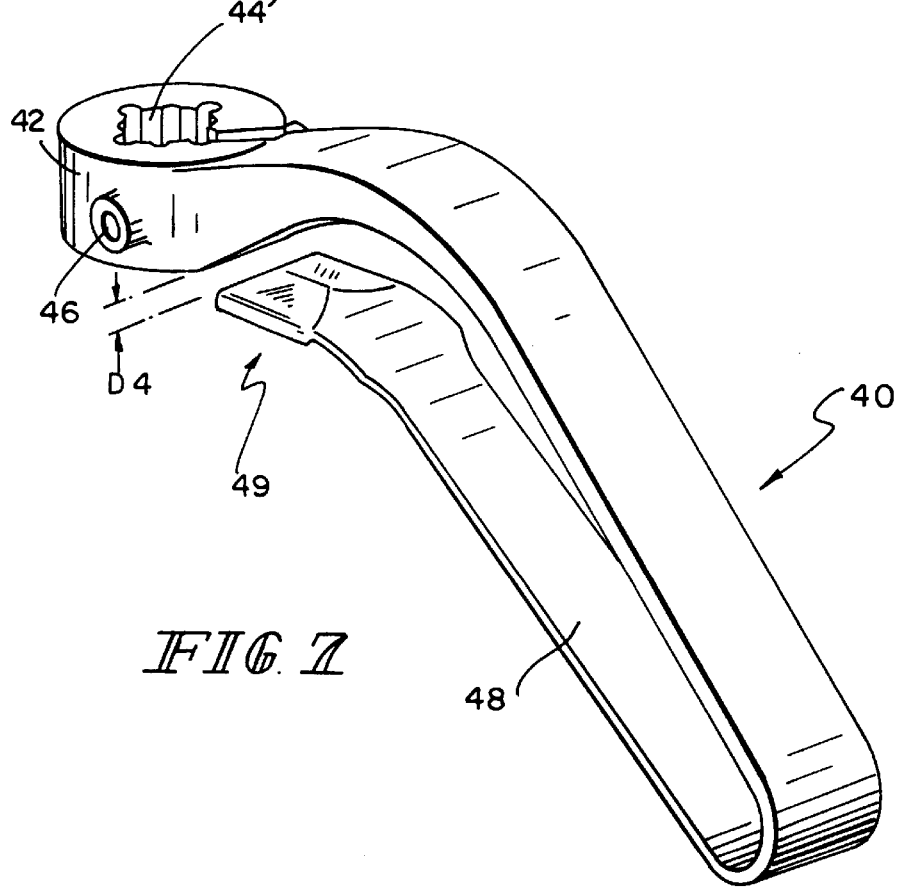
FIG. 6
FIG. 7

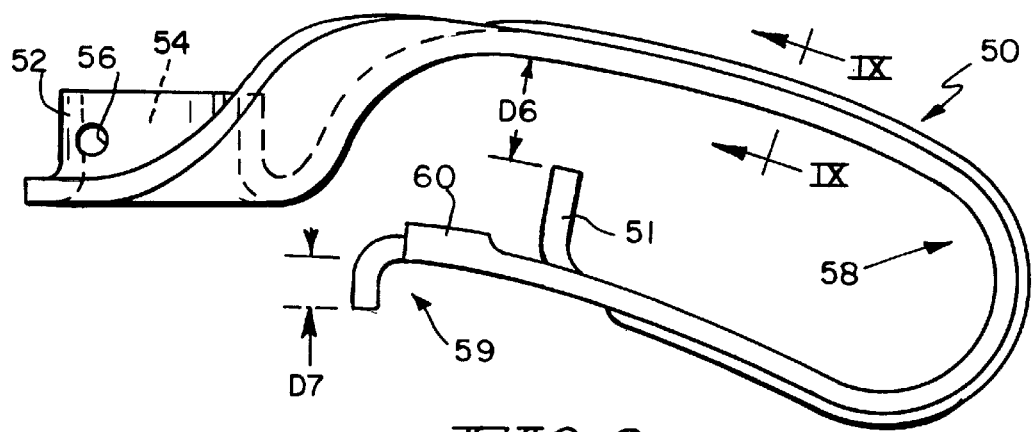
FIG. 8
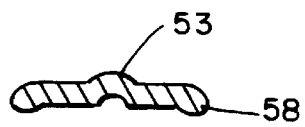
FIG. 9
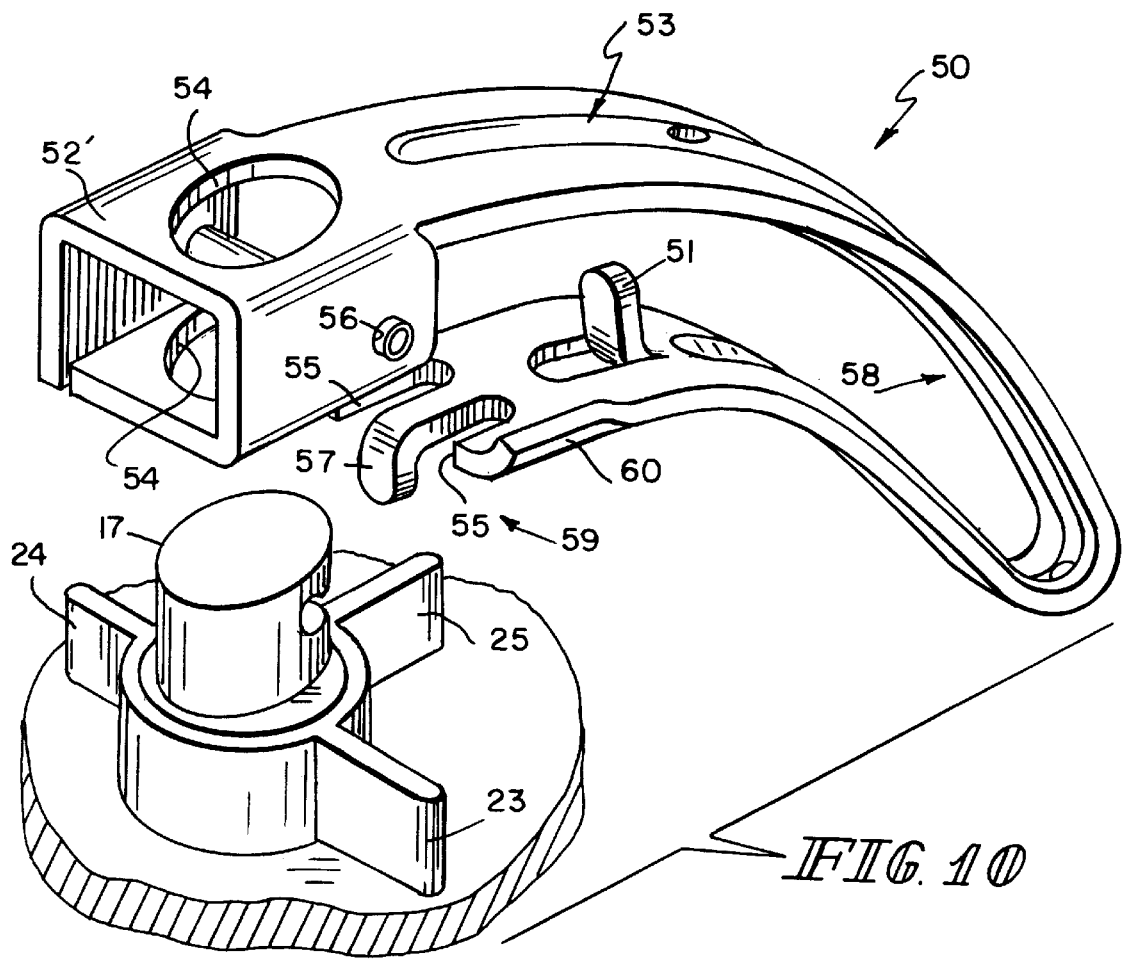
FIG. 10

SPRING LOADED VALVE HANDLE

BACKGROUND AND SUMMARY OF THE INVENTION

The present invention relates generally to handles for valves and cocks and more specifically to an improved locking handle for valve and cocks employed in air brake systems of railway trains.

Angle cocks or valves are provided throughout the air brake system of railroad trains to interconnect the cars. The open or closed condition of the valve is important to the operation of the air brakes of a train. While the last angle cock on the last car must be closed, all other angle cocks throughout the train must remain open for effective operation of the air brakes. Presently, cars using the regime of the American Association of Railroads ("AAR"), use a two-piece angle cock handle wherein one piece is mounted to the shaft of the actuator of the valve and a second piece pivots relative thereto to lock and unlock the handle and the position of the valve. Stops provided on the cover of the valve engaged with the handle to limit the degree of opening and closing of the handle and valve as well as to lock the valve in a specific condition. A spring or gravity returns the handle to its lowered position. Typical examples are illustrated in FIGS. 1 and 2 to be discussed in detail below.

In Europe and other countries, single piece handles have been used wherein the U-shaped structure of the handle provides its own spring bias and a detent at the end of the handle engages a portion of the cover of the valve housing. A typical example is illustrated in FIGS. 3 and 4 which will be discussed in more detail below. This handle requires a complementary cover and cannot be retrofitted to AAR valves.

The present invention is a unitary handle structure to be secured to the shaft of the valve and cooperate with the stops on the body to delimit and lock the valve element in its open and closed positions. The handle structure includes a socket portion fixed to the stem of the valve element and a handle portion extending from the socket portion and doubling back towards the socket portion and terminating at an end adjacent the socket portion. A detent portion on the end includes a pair of walls sufficiently spaced to receive the stops to lock the valve element in the open and closed positions. The handle portion is flexibly resilient to allow the detent portion to raise and lower with respect to the stops.

One of the walls of the detent has a height high enough and the end of the handle portion is separated from the adjacent portion of the handle by a sufficiently short distance to prevent the one wall of the detent portion from raising above the stops. This could be achieved by the detent portion including a first projection extending downward towards the body a first distance and the handle portion includes a second projection adjacent the end extending up a second distance towards the handle portion. The first and second distance are sufficient to prevent the first projection from raising above the stops.

The detent portion includes a center wall between the first and second walls. The center wall is sufficiently spaced from the first and second walls to receive the stops to lock the valve element in the open and closed position. The center wall extends down towards the body at a greater distance than the first and second walls extend towards the body. The pair of walls of the detent may constitute opposed walls of a slot in the end of the handle portion in which case, the detent includes the projection extending from the slot down towards the body.

As an alternative, the handle may not be a unitary structure, but an integral structure having the socket portion fix the stem of the valve element and a handle portion extending from the socket portion, doubling back towards the socket portion and terminating at an end adjacent the socket portion. The detent portion is on the end and includes a pair of walls sufficiently spaced to receive the stop on the body to lock the valve element in the open and closed positions. The end of the handle portion being movable relative to the socket portion to allow the detent to raise and lower with respect to the stops. This movement may be either from the resilient flexibility of the handle portion or the handle portion may be pivotally connected to the socket portion. The handle may be a stamping, casting, forgery or plastic molded.

Other objects, advantages and novel features of the present invention will become apparent from the following detailed description of the invention when considered in conjunction with the accompanying drawings.

BRIEF DESCRIPTION OF THE DRAWINGS

FIG. 1 is a plan view of a valve with a two-piece handle for a valve of the prior art.

FIG. 2 is a side view of the prior art valve of FIG. 1.

FIG. 3 is a side view of a one-piece handle for a valve with a detent of the prior art.

FIG. 4 is a cross-sectional view taken along the lines IV—IV of FIG. 3.

FIG. 5 is a perspective view of the first embodiment of a unitary handle of the present invention.

FIG. 6 is a cross-sectional view taken along the lines VI—VI of FIG. 5.

FIG. 7 is a perspective view of a second embodiment of a unitary handle incorporating the principles of the present invention.

FIG. 8 is a side view of a third embodiment of a unitary handle incorporating the principles of the present invention.

FIG. 9 is a cross-sectional view taken along the lines IX—IX of FIG. 8.

FIG. 10 is a perspective view of a fourth embodiment of a unitary handle incorporating the principles of the present invention.

DETAILED DESCRIPTION OF THE PREFERRED EMBODIMENTS

A two-piece handle for an angle cock or other such valve of the prior art is illustrated in FIGS. 1 or 2. A valve body 11 includes a cover 12 and a locking handle mechanism 13 which selects and locks the open and closed position of the valve. The handle mechanism 13 includes a socket portion 14 and a handle portion 15. An opening 16 in the socket portion 14 receives operating stem 17 of the valve member within the valve body 11. Fastener 18 through the socket portion 14 clamps the socket portion on the stem 17.

The handle portion 15 includes a handle lever 19 extending from one end and a bifurcated boss 20 at the other end. A lug 21 of the socket portion 14 receives the boss 20 and is pivotally connected thereto by a pin 22. The cover 12 includes a pair of opposed bosses 23 and 24 and a boss 25 therebetween as seen in FIG. 1. Lugs 26 on each side of the handle portion 13 engage the stops 23 and 24 in the position illustrated in FIGS. 1 to lock the handle in one angular position and when raised as shown in FIG. 2 and rotated 90° degrees counter-clockwise in FIG. 1 and subsequently lower, will engage stop 25.

A tang 27 projects from the side of the socket portion 14 and rotates between stops 24 and 25. Tang 27 is not raised or lowered by the pivotal movement of the handle 19 as are lugs 26 and therefore delimits the movement of the handle. Tang 27 is also received in slot 28 of the handle 19 when the handle 13 is in its down position. The two-piece handle structure of FIGS. 1 and 2 stays in its down position by gravity or springs and may be applied.

A single piece spring loaded handle of the prior art is illustrated in FIGS. 3 and 4. The handle 30 includes a socket portion 32 having an opening 34 to receive the valve stem 31 and an aperture 36 to receive a fastener 37 to secure the handle to the valve stem. The handle portion 38 of handle 30 extends from the socket portion 32 and double backs on itself to form a substantially U-shaped handle portion 38. The end of the handle portion 38 terminates adjacent to the socket portion 32 and includes a detent 39. The detent 39 has a triangular cross section as illustrated in FIG. 4 and is received in triangular recesses 33 of the cover. The distance D1 between the end of the handle portion 38 and adjacent portion of handle 30 and the distance D2 of the detent 39 are selected to prevent the detent 39 from being raised above the top of walls or stops 35.

An improved handle structure for an angle cock or other valves according to the principles of the present invention is illustrated through FIGS. 5–10. The embodiments of FIGS. 5–7 show a cast, forged or plastic molded handle, while the embodiments of FIGS. 8–10 show a stamped handle. The improved handle allows retrofitting to existing valve stems and covers without modification.

The handle 40 of FIGS. 5–7 includes a socket portion 42, having a round opening 44 in FIG. 5 and a square opening 44' (or elliptical) in FIG. 7 and an aperture 46 to receive a fastener to secure the stem 17 of the valve in the opening 44, 44'. The handle portion 48 extends from the socket portion and double backs on itself and terminates at an end adjacent to the socket portion 42. A detent 49 is provided on the end of the handle portion 48. As illustrated in detail in FIG. 6, the detent 49 includes a center wall 47 between a pair of walls 45. The distance D3 between the center wall 47 and one of the side walls 45 is sufficient to receive the width of stops 23, 24 and 25 on the cover of the valve body.

The center wall 47 is a projection extending down from the handle with greater distance than the walls 45. The center wall 47 extends down a distance D5 from the handle. The distance between the end of the handle 48 and an adjacent portion of the handle 40 to which it would intersect if it was raised all the way, is D4. The distance D4 of separation and the distance D5, the length of projection of wall 47, are selected to prevent the wall 47 from being raised above the top of the stops 24 and 25. Thus, the center wall 47 can only rotate within the arc between stops 24 and 25. The shorter walls 45 do raise above and fall down below the tops of walls 24 and 25 to lock the handle in the position as defined by the stops 24 and 25. The handle portion 48 is sufficiently flexibly resilient so as to be raised up to unlatch the handle and to separate the detent 49 from the stops 24, 25 while allowing a lock-in-place, when pressure on the handle is removed.

The handle 40 of FIGS. 5–7 is a forged or cast handle and may be made from cast iron, steel, spring steel, aluminum or high strength plastic. If made of a metallic material, the handle may be coated with a slip resistant material for example, a plastic coating.

Another embodiment is the handle 50 which is the stamp handle illustrated in FIGS. 8–10. The handle 50 includes a socket portion 52, 52' with an elliptical opening 54 to receive valve stem 17 and an aperture 56 to receive a fastener to hold the socket portion to the valve stem 17. The handle portion 58 extends from the socket portion 52 and double backs on itself and terminates at an end adjacent to the socket portion 52. A detent 59 is provided at the end of the handle 58 adjacent to the socket portion 52.

As seen in detail in FIG. 10, the detent 59 includes a center projection 57 forming a center wall between a pair of opposed side walls 55. This center projection 57 and the side walls 55 are side walls of slots formed on each side of the projection 57. The edge of the end of the handle portion 58 is turned up at 60 adjacent to the side walls 55 to aid the end of the handle to ride over the stops 25 and 24. The distance between the center wall 55 and the side walls 55 is sufficient to receive the width of the stops 24 and 25. The handle portion 58 includes a gusset 53 formed therein to add stiffness to the stamped handle.

To limit the amount of travel of the lower portion of the handle towards the top portion of the handle, a projection 51 extends up from the handle. The distance D6 between the top of the projection 51 and the remainder of the handle portion 58 plus the depth D7 of the projection 57 of the detent 59 prevents the projection 57 from ever being raised higher than the height of the stops 24 and 25.

The gusset 53, the projection 51 and 57 and the slots between 57 and 55 are usually formed in a stamping operation. Socket portion 52 of the handle 58 in FIG. 8 may also be easily formed in a stamped operation. The socket portion 52' of FIG. 10 is stamped punching the openings 54 in a flat socket portion and then bending the walls to form the rectangular cross section socket portion 52'.

Although the preferred embodiments of the present invention has been described as a unitary handle having the socket portion, the handle portion and the detent, the concept of having a detent with a long center portion and a pair of shorter side wall portions, having a distance of separation sufficient to receive the width of the detents 24 and 25 may also be used with a two-piece rotating handle illustrated in FIGS. 1 and 2. This would also include the double-backed handle portion 48 and 58. Although not preferred in that it increases the number of parts and expenses, this is within the purview of the present invention.

The handles 40 and 50 of FIGS. 5–10 are designed to be used with existing AAR valve structures including stems and covers, while achieving improvements in operation and cost.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A valve including a body, a valve element in the body having an open and closed position, and a handle connected to a stem of the valve element and cooperating with at least a pair of stops on the body to delimit and lock the valve element in the open and closed positions, the handle being a unitary structure and comprising:

a socket portion fixed to the stem of the valve element;

a handle portion extending from the socket portion, at least a portion of the handle portion doubling back towards the socket portion, and terminating at an end adjacent to and movable relative to the socket portion; and a detent portion on the end of the handle portion and including a pair of walls sufficiently spaced to form at least one stop receiving slot for receiving at least one of the pairs of stops to lock the valve element in at least one of the open and closed positions.

2. A valve according to claim 1, wherein the handle portion is flexibly resilient to allow the detent portion to raise and lower with respect to the stops.

3. A valve according to claim 2, wherein one of the walls has a height high enough and the end of the handle portion is separated from an adjacent portion of the handle by a sufficiently short distance to prevent the one wall of the detent portion from raising above the stops.

4. A valve according to claim 2, wherein the detent portion includes a first projection extending down towards the body a first distance and the handle portion includes a second projection adjacent the end extending up a second distance towards the handle portion; and the first and second distances are sufficient to prevent the first projection from raising above the stops.

5. A valve according to claim 1, wherein the handle is a stamping.

6. A valve according to claim 1, wherein the handle is a casting.

7. A valve according to claim 1, wherein the handle is a forging.

8. A valve according to claim 1, wherein the handle is a molded part.

9. A valve according to claim 1, wherein the detent portion includes a center wall between first and second walls, and the center wall is sufficiently spaced from the first and second walls to form a pair of stop receiving slots for receiving one of the stops respectively to lock the valve element in the open and closed positions.

10. A valve according to claim 9, wherein the center wall extends down towards the body a greater distance than the first and second walls extend towards the body.

11. A valve according to claim 1, the detent includes a projection extending down towards the body.

12. A valve including a body, a valve element in the body having an open and closed position, and a handle connected to a stem of the valve element and cooperating with at least a pair of stops on the body to delimit and lock the valve element in the open and closed positions, the handle comprising:

a socket portion fixed to the stem of the valve element;

a continuous handle portion extending from the socket portion, at least a portion of the handle portion doubling back towards the socket portion, and terminating at an end adjacent the socket portion;

a detent portion on the end of the handle portion and including a pair of walls sufficiently spaced to form at least one stop receiving slot for receiving at least one of the stops to lock the valve element in at least one of the open and closed positions; and the end of the handle portion being flexibly movable relative to the socket portion to allow the detent to raise and lower with respect to the stops.

13. A handle for a valve including a body, a valve element in the body having an open and closed position, a stem of the valve element to which the handle is to be connected and at least a pair of stops on the body cooperating with the handle to delimit and lock the valve element in the open and closed positions, the handle comprising:

a socket portion to be fixed to the stem of the valve element;

a handle portion extending from the socket portion, at least a portion of the handle portion doubling back towards the socket portion, and terminating at an end adjacent to and movable relative to the socket portion;

a detent portion on the end of the handle portion and including a pair of walls sufficiently space to form at least one stop receiving slot for receiving at least one of the stops to lock the valve element in at least one of the open and closed position.

* * * * *